July 4, 1944.  G. F. RACKETT  2,352,914
PHOTOGRAPHIC PRINTING
Filed Nov. 15, 1940
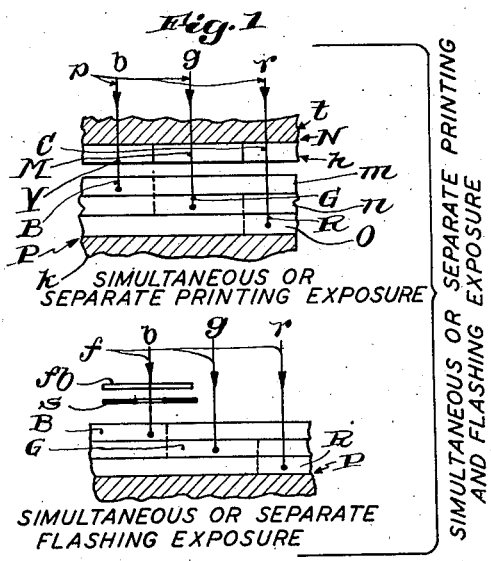
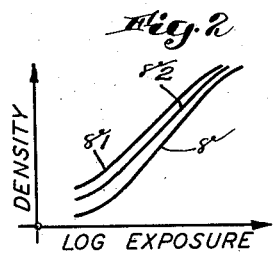
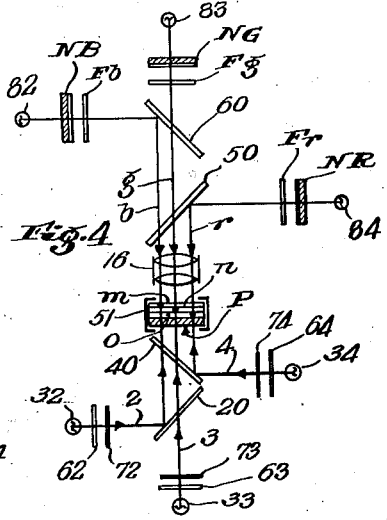
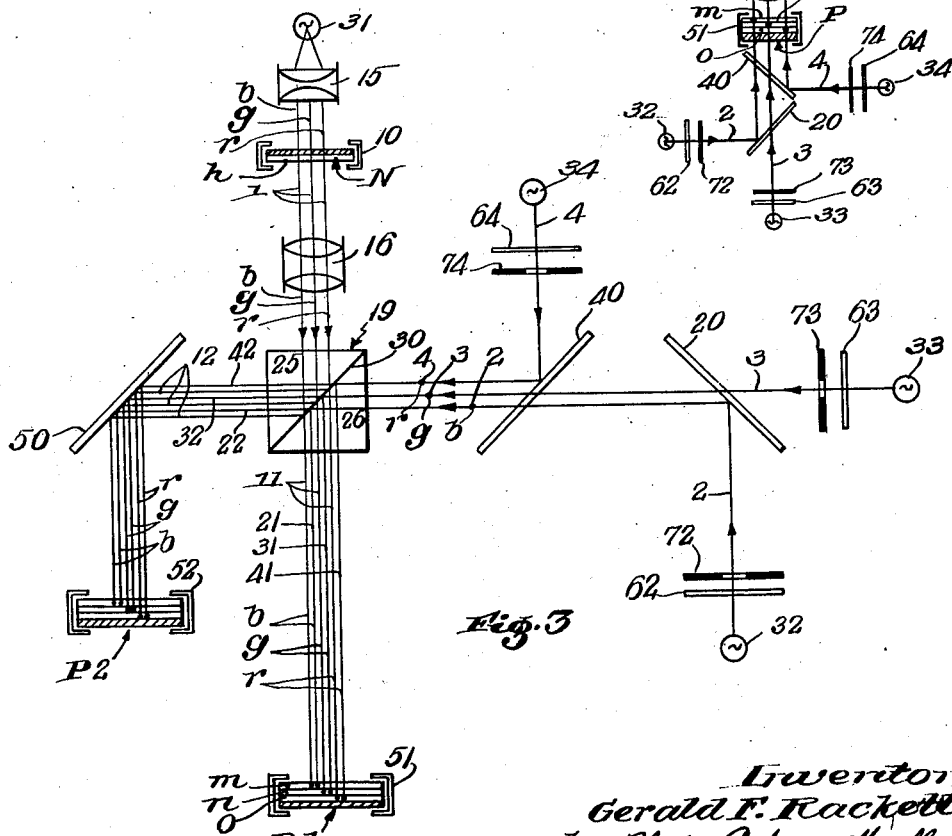
Inventor
Gerald F. Rackett, Patented July 4, 1944

2,352,914

UNITED STATES PATENT OFFICE 2,352,914

PHOTOGRAPHIC PRINTING

Gerald F. Rackett, Los Angeles, Calif., assignor to Technicolor Motion Picture Corporation, Los Angeles, Calif., a corporation of Maine Application November 15, 1940, Serial No. 365,736

7 Claims. (Cl. 88—24)

In black and white photography it is comparatively easy to control the contrast of the final record by conventional means as proper selection and correlation of the characteristics of emulsions, of exposure times and of development. The copying of photographic color records however introduces in this respect difficult problems since it may involve the use of several records and of emulsions whose characteristics are prescribed by the process as a whole, can not be selected individually at will and can not be continuously modified or balanced against each other to conform to changing requirements. This is especially true in the manufacture of motion pictures where still further limitations are imposed by the necessity of working comparatively fast, of making a large number of prints of uniform quality and of mechanizing the entire printing process as far as possible.

Accordingly, in order to alleviate these difficulties, the objects of the present invention include adjusting during printing the contrast of a color aspect reproduction without adding to the normal printing time; simultaneously printing several copies from color aspect records while controlling the contrast of the copies; affecting while printing the contrast characteristics of one or more of a set of superimposed color aspect reproductions; controlling the contrast characteristics of such reproductions independently of each other so that they can be mutually adjusted; printing at one and the same time several copies of a color original or of several originals while flashing each copy to control its contrast; and controlling the contrast of a record printed in one layer of a multi-layer emulsion independently of the contrast in another layer.

In one of its aspects the invention contemplates simultaneous application of copying and flashing exposures, in order to utilize for the above purposes the known phenomenon that short overall exposures decrease the photographic contrast of a picture resulting from the latent record printed on the emulsion; this may be accomplished for example with the aid of a light combining optical system. In another aspect, an optical system is used for dividing the printing as well as the flashing light, so that several positives can be simultaneously printed and flashed. In still another aspect, a light beam for simultaneously flashing several superimposed emulsion layers is composed of light of different spectral ranges corresponding to the effective sensitivities of the respective emulsion layers, and this light may be applied in such a manner that each light component can be separately controlled concerning its spectral range and its intensity, which permits with certainty separate control of the record contrasts during simultaneous flashing of all layers. The spectral ranges of the printing light beams and the sensitivities can be mutually adjusted so that one or several components of a multi-layer emulsion can be individually selected for contrast control.

These and other objects, features and aspects of the invention will be apparent from the following description of several embodiments thereof representative of its genus, this description referring to a drawing in which Fig. 1 is a diagrammatic representation of printing according to the invention;

Fig. 2 is a diagram illustrating contrast control according to the invention;

Fig. 3 is a diagrammatical view of apparatus for the simultaneous printing and flashing exposure of several reproductions; and Fig. 4 is a diagrammatical view similar to Fig. 3, showing printing from three color aspect records and flashing through the support.

Referring especially to Fig. 1, the method according to the invention will first be explained without regard to any particular apparatus for carrying it out. In this figure, N is a colored record, consisting for example of a cellulose film $t$ supporting a hardened gelatine layer $h$ containing a set of dye records of the blue, green and red color aspects of a scene, in yellow (minus blue) dye Y, magenta (minus green) dye M and cyan (minus red) dye C, respectively. This may for example be a color film positive of the well-known type made by dye transfer printing from gelatine relief matrices as for example described in Patent No. 1,919,673, dated July 25, 1933. Other types of records may be used, for example, integral pack records or black and white color separation records on individual supports and optically superimposed with colored printing light.

The reproduction may be made on an integral pack P (for the terminology herein used compare "Journal of the Society of Motion Picture Engineers," vol. XXVII, page 164, August, 1936, Report of the color committee) having on a carrier or support $k$ a set of three superimposed emulsion layers $m$, $n$ and $o$ sensitive to blue, green and red light, respectively. Suitable filter layers absorbing blue and green light may be inserted between layers $m$, $n$ and $o$ in well-known manner. Films N and P are now printed in a contact or projection printer with light containing the effective printing light ranges, as indicated by printing light beam $p$ of Fig. 1. Since layer $m$ is sensitive for blue light $b$ which is the only one selectively absorbed by the yellow dye representing the blue color aspect record, a latent record B of the blue color aspect record will be produced in layer $m$. Similarly, latent records G and R of the green and red color aspects will be produced in layers $n$ and $o$. It will be understood that the printing exposures with blue, green and red light, respectively, may take place either simultaneously or in separate steps.

Preferably simultaneous with the above described printing exposure, a flash exposure is applied according to the invention by means of a flashing beam $f$ of colored light uniformly distributed over the record area.

If it is desired to control the photographic contrast (that is the slope of the characteristic log exposure-density relation) of latent record B, flashing beam $f$ will be blue, as indicated by blue transmitting filter $fb$. The flashing intensity will be suitably controlled for example (assuming constant printing time) by means of an adjustable aperture $s$. The contrast of the other, green and red sensitive layers may be similarly controlled with green and red light flash exposures.

The film P is then processed in well known manner, for example by means of reversal and color development, in order to convert latent records B, G and R into visible color reproductions.

Assuming that conventional exposure would produce a contrast (Fig. 2) typical of the normal processing for the reproduction records, the method according to the invention permits a selective contrast change resulting for example in contrast $\gamma 1=1.2$ for the record in layer $m$ and $\gamma 2=1.35$ for the record in layer $n$. It will be evident that the new method permits mutual adjustment of the various color aspect reproductions concerning their contrast properties, which is very desirable in order to obtain correct balance of the part records and optimum rendering of the colors of the object field. It will be understood that any one, or any group of color reproduction records may undergo a given, and through control of flashing intensity predetermined, shifting of the characteristic curve and that control of flashing beams $f$, as above described, permits individual control in this respect.

It will be understood that instead of a three color system as above described, a blue-green (printed in red-orange) and red-orange (printed in blue-green) two color system may be controlled by accordance with the invention. It will be further understood that the colors or hues of the color aspect records and the corresponding sensitivities of the color aspect reproduction material must not necessarily correspond to the physiological or "natural" spectral ranges used in three or two color photography, but that they may be shifted in the spectrum and include invisible, as infra red or ultra violet, ranges. It will be apparent that separate black and white color aspect records may be used for printing on superimposed emulsion layers or strata with light to which the respective layers are sensitive. Further, it will be obvious that either positives, as master positives, or negatives, as duplicate negatives, may be used as either color aspect records or color aspect reproductions, since well-known present day photographic methods permit printing of any record either as positive or as negative. Still further, it is understood that the invention can not only be applied to integral packs but also to packs with separate supports.

A practical embodiment of the invention, especially suited for high speed production of a considerable number of prints will now be described with reference to Fig. 3.

In Fig. 3, 10 is a film gate for guiding a film N having a gelatine layer $h$ containing three dye records in yellow, magenta, and cyan dye and representing the blue, green and red color aspects of an object field, as above described. The film is illuminated by a printing light source for example an arc 31 and a condenser system 15, and projected with a suitable lens system 16. In the projected light beam 1 is inserted a light-dividing and combining system for example of the type described in Patent No. 2,072,091, dated March 2, 1937. Such a system may consist of a double prism 19 having two prism halves 25 and 26 with a partly transmitting, partly reflecting layer 30 therebetween which divides main beam 1 into two component beams 11 and 12. On the other side of the surface of reflector 30 are three flashing light sources 32, 33, 34 emitting light beams 2, 3 and 4 of uniform intensity over the record area. Beams 2 and 4 are directed into the direction of beam 3 by means of transparent reflectors 20 and 40, respectively. Beams 2, 3 and 4 are divided by surface 30 into component beams 21, 31, 41 in the direction of beam 11 and component beams 22, 32, 42 in the direction of beam 12. Composite beam 12, 33, 32, 42 is deflected at 50 into the direction of beam 12, reflector 50 providing the proper transverse orientation of the image. In composite beams 11, 21, 31, 41 and 12, 22, 32, 42 are arranged two film gates 51 and 52, respectively, which guide two positive films P1, P2, respectively, which may be of the integral pack type with three layers for the blue, green and red color aspects, respectively, as above described. In known manner, the three films N, P1 and P2 are run in synchronism through their respective film gates 10, 51 and 52.

In flashing beam 2 are inserted a blue transmitting filter 62 and an adjustable aperture 72, in beam 3 a green transmitting filter 63 and an adjustable aperture 73 and in beam 4 a red transmitting filter 64 and an adjustable aperture 74.

It will now be apparent without detailed explanation that the three color aspect records of film N can be simultaneously printed on the three respective emulsion layers $m$, $n$, $o$ of films P1 and P2, and that, simultaneously to printing, all six emulsion layers can be flashed. The flash exposure intensity for each pair of emulsion layers of similar sensitivity is similar, but can be regulated independently of the flash exposure of each other emulsion pair of similar sensitivity by adjusting apertures 72, 73 and 74, respectively. This adjustment can be automatically controlled by means of notches in film N, in a manner well-known for controlling the printing light intensity. It will be further apparent that the spectral range of the flash exposures can be conveniently brought into conformity with the sensitivities of the layers of films P1 and P2, by suitably selecting the transmission ranges of filters 62, 63, 64 respectively. Light from source 33 reflected at 20 and 40, and light from 32 and 34 transmitted through 20 and 40, is harmless and can be suitably absorbed in the printer.

In the example of Fig. 3, filters 62, 63 and 64 transmit blue, green and red light, respectively, and throughout this figure the respective printing light components, sensitivities and flashing light ranges are indicated by letters b, g and r standing for blue, green and red, respectively.

It will be understood that in a device for example according to Fig. 3, the arrangement for separately and independently controlling the flashing light for the respective layers m, n and o can be omitted if variation of the relative intensity and composition of the flashing light components during printing is not desired. In that case, the characteristics of the flashing light can be determined by suitably selecting a light source, a filter and an aperture for a single flashing light beam composed of light of the required spectral ranges at the required intensity for each range.

Instead of using an arrangement having an element for superimposing the printing and flashing light beams, such as shown in Fig. 3, this element can be omitted if the printing and flashing beams are applied from opposite sides of the film, as indicated in Fig. 4. In Figs. 3 and 4 elements having corresponding functions are similarly marked.

In Fig. 4, integral pack P is again exposed with a beam b, g, r containing red, green and blue light reaching from the emulsion side of pack P its three layers m, n and o which are blue, green and red sensitive, respectively. Instead of a single original record, three color separation records NB, NG and NR are shown in this embodiment. These may be conventional silver records, for example master positives, illuminated by suitable optical apparatus indicated by light sources 82, 83, 84 and including blue, green and red filters Fb, Fg and Fr, respectively. The three images are superimposed upon the emulsions of pack film P by means of an optical arrangement including semi-transparent reflectors 50 and 60 and copying lens 16.

A flashing arrangement similar to that of Fig. 3 is arranged on the support side of film P; this arrangement consists of light sources 32, 33, 34, filters 62, 63, 64, shutters 72, 73, 74, and semi-transparent mirrors 20 and 40.

The operation of the modification according to Fig. 4 will be evident without further explanation; it is essentially the same as that according to Fig. 3, and involves again the separate control of the intensities and flashing beams effecting spectral ranges of the red, green and blue emulsions o, n and m respectively. It will be understood that flashing through the backs is especially applicable to integral packs with layers which are inherently color selective and do not require filter layers or only weak filters.

It is understood that two positive films could be simultaneously printed while flashing through the support; in that case a light dividing prism similar to 19 of Fig. 3 could be inserted between flashing reflector 40 of Fig. 4 and the two positive films P1, P2 shown in Fig. 3 and exposed through prism 19 either from a single original as in Fig. 3 or from separate color aspect records as shown in Fig. 4.

It will be understood that the relative intensities of printing and flashing exposures depend largely on the character of the original records, on the sensitivity of the reproduction emulsions, and on the nature of the light dividers, reflectors and filters used. As an approximate guide, however, it may be said that satisfactory results can be obtained with apparatus similar to that indicated in Fig. 3 using as printing system a projection lamp with reflector uniformly illuminating the film aperture by means of a conventional relay condenser system, reflectors and light splitters of the best available quality as used in light dividing cameras, incandescent lamps as flashing light sources and filters similar to conventional taking filters for selecting the flashing ranges. A positive of the commercial color film type with dye transfer printed records in a single gelatine layer or three color aspect records can be printed with such equipment on two integral tripack films of the commercial type made for reversal development in color, with exposure time permitting control of the flashing light intensities by means of standard iris apertures in such a manner that the contrast values of the individual color aspect reproductions are effectively reduced and mutually balanced. As in every photographic process of this type, the exact exposure values must of course be experimentally determined for any given printing set up.

It should be understood that the present disclosure is for the purpose of illustration only and that this invention includes all modifications and equivalents which fall within the scope of the appended claims.

I claim:

1. Photographic printing apparatus comprising means for transporting a color aspect record to be reproduced, means for guiding a film carrying two emulsion layers sensitive to different spectral ranges and to be simultaneously exposed to said record, a source of printing light, means for projecting from said source a printing light beam through the record in said transporting means towards the film in said guiding means, light source means providing two beams of flashing light of two spectral ranges respectively, means for directing said flashing beams towards said film in said guiding means, and means in each of said flashing beams for controlling the intensity and spectral range of said beams.

2. Photographic printing apparatus comprising means for transporting a color aspect record to be reproduced, means for guiding two films carrying emulsion layers sensitive to different spectral ranges and to be exposed to said record, a source of printing light, means for projecting from said source a printing light beam through the record in said transporting means, light dividing means in said beam behind said transporting means for directing component printing beams towards the films in said guiding means, light source means providing a beam of flashing light of one of said ranges, means for directing a component of said flashing beam towards each of the films in said guiding means, respectively, and means in said flashing beam for controlling the intensity and spectral range of said flashing beam.

3. Photographic printing apparatus comprising means for transporting a color aspect record to be reproduced, means for guiding two films each carrying two emulsion layers sensitive to different spectral regions and to be simultaneously exposed to said record, a source of printing light, means for projecting from said source a printing light beam through the record in said transporting means, light dividing means in said beam behind said transporting means for directing component printing beams towards the films in said guiding means, light source means providing two beams of flashing light of two spectral ranges respectively, means for directing a portion of each of said two flashing beams toward each of the films in said guiding means, and means in each of said flashing beams between said light source means and said directing means for controlling the intensity and spectral range of said flashing beams, respectively.

4. Apparatus for forming different color-aspect records of a scene in the different layers respectively of a multilayer film comprising a film support having an exposure window, an optical system for transmitting light to said film, the system having a main path leading to said window and branch paths leading to the main path, light sources in the branch paths, and a partial reflector at the junction between the main and branch paths, light transmitted from one of said sources along one branch path passing through the reflector and thence along the main path and light transmitted from another of said sources along another branch path being reflected along the main path, whereby said layers may be exposed simultaneously with different light components respectively and the components may be controlled independently of each other.

5. Apparatus for forming different color-aspect records of a scene in the different layers respectively of a multi-layer film comprising a film support having an exposure window, means for exposing the different layers to the different aspects respectively, an optical system for transmitting flashing light of different colors to said layers respectively, the system having a main path leading to said window and branch paths leading to the main path, light sources in the branch paths, and a partial reflector at the junction between the main and branch paths, light transmitted from one of said sources along one branch path passing through the reflector and thence along the main path and light transmitted from another of said sources along another branch path being reflected along the main path, whereby said layers may be exposed simultaneously with different light components respectively and the components may be controlled independently of each other.

6. Apparatus for forming different color-aspect records of a scene in the different layers respectively of a multi-layer film comprising a film support having an exposure window, means on one side of the film for exposing the different layers to the different aspects respectively, an optical system on the other side of the film for transmitting flashing light of different colors to said layers respectively, the system having a main path leading to said window and branch paths leading to the main path, light sources in the branch paths, and a partial reflector at the junction between the main and branch paths, light transmitted from one of said sources along one branch path passing through the reflector and thence along the main path and light transmitted from another of said sources along another branch path being reflected along the main path, whereby said layers may be exposed simultaneously with different light components respectively and the components may be controlled independently of each other.

7. Apparatus for forming different color-aspect records of a scene in the different layers respectively of a multi-layer film comprising a film support having an exposure window, two optical systems for transmitting light to said film from opposite sides, each system having a main path leading to said window and branch paths leading to the main path, light sources in the branch paths, a partial reflector at the junction between the main and branch paths, light transmitted from one of said sources along one branch path passing through the reflector and thence along the main path and light transmitted from another of said sources along another branch path being reflected along the main path, means for supporting color-separation records in the branch paths of one of said systems, and means for supporting filters in the branch paths of the other system, whereby the layers may be simultaneously printed and flashed and each light component for each layer may be controlled independently of each other component, whereby said layers may be exposed simultaneously with different light components respectively and the components may be controlled independently of each other.

GERALD F. RACKETT.